US012777025B1

(12) United States Patent
Arnold et al.

(10) Patent No.: US 12,777,025 B1
(45) **Date of Patent: *Oct. 27, 2026**

(54) SYSTEMS AND METHODS FOR SECURELY ROUTING DATA VIA A CRYPTOGRAPHIC TAG

(71) Applicant: Veeva Systems Inc., Pleasanton, CA (US)

(72) Inventors: Bradley Arnold, Lakewood, CO (US); Marius K. Mortensen, Burlington (CA)

(73) Assignee: Veeva Systems Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/281,224

(22) Filed: Jul. 25, 2025

(51) Int. Cl.

*H04L 29/06* (2006.01)
*H04L 9/08* (2006.01)
*H04L 9/40* (2022.01)

(52) U.S. Cl.

CPC ........ *H04L 63/0428* (2013.01); *H04L 9/0861* (2013.01); *H04L 63/20* (2013.01)

(58) Field of Classification Search

CPC .... H04L 63/0428; H04L 9/0861; H04L 63/20
See application file for complete search history.

(56) References Cited

U.S. PATENT DOCUMENTS 11,086,869 B1 * 8/2021 Aleti .................. G06F 16/2453
2025/0054068 A1 * 2/2025 Arriaga .................. G06Q 40/08

* cited by examiner

*Primary Examiner* — Evans Desrosiers

(57) ABSTRACT

A method for securely routing a case dataset based on a tag including selecting the case dataset including case data and modifying a state associated with the case dataset from a first stage to a second stage. The method includes selecting a ruleset including a first rule and a second rule from a rule repository. The first rule includes a first rule criterion, a first rule outcome action, a first priority, and a first tag. The second rule includes a second rule criterion, a second rule outcome action, a second priority, and a second tag. The method includes determining the second criterion of the second rule is fulfilled. The method includes executing the second rule outcome action of the second rule. The method includes modifying the case data based on the second tag of the second rule. The method further includes executing a tag action based on the second tag.

20 Claims, 5 Drawing Sheets

SYSTEMS AND METHODS FOR SECURELY ROUTING DATA VIA A CRYPTOGRAPHIC TAG

TECHNICAL FIELD

The present disclosure relates to systems and methods for securely routing data via a cryptographic tag.

BACKGROUND

Researchers, scientists, academics, government regulators, technologists, and other stakeholders are increasingly in need of efficient and simple ways to protect and route data via tags.

SUMMARY

One embodiment relates to a method for securely routing a case dataset based on a tag. The method includes selecting the case dataset including case data from a case repository. The case dataset is associated with a state in a first stage. The method further includes modifying the state associated with the case dataset from the first stage to a second stage. The method further includes selecting, and in response to modifying the state of the case data, a ruleset including a first rule and a second rule from a rule repository. The first rule includes a first rule criterion, a first rule outcome action, a first priority, and a first tag. The second rule includes a second rule criterion, a second rule outcome action, a second priority, and a second tag. The method further includes selecting the first rule of the ruleset based on the first priority of the first rule and determining the first criterion of the first rule is not fulfilled. The method further includes selecting, in response to determining the first criterion of the first rule is not fulfilled, the second rule of the ruleset and determining the second criterion of the second rule is fulfilled. The method further includes executing the second rule outcome action of the second rule. The method further includes modifying the case data based on the second tag of the second rule. The method further includes executing a tag action based on the second tag.

Another embodiment relates to a method for securely routing a case dataset based on a tag. The method includes selecting the case dataset including case data from a case repository. The method further includes receiving a request to evaluate a ruleset. The method further includes selecting, in response to receiving the request, the ruleset including a first rule and a second rule from a rule repository. The first rule includes a first rule criterion, a first rule outcome action, a first priority, and a first tag. The second rule includes a second rule criterion, a second rule outcome action, a second priority, and a second tag. The method further includes selecting the first rule of the ruleset based on the first priority of the first rule and determining the first criterion of the first rule is not fulfilled. The method further includes selecting, in response to determining the first criterion of the first rule is not fulfilled, the second rule of the ruleset and determining the second criterion of the second rule is fulfilled. The method further includes executing the second rule outcome action of the second rule. The method further includes modifying the case data based on the second tag of the second rule. The method further includes executing a tag action based on the second tag.

Another embodiment relates to a non-transitory computer readable medium having computer executable instructions embodied therein that, when executed by at least one processor of a computing system, cause the computing system to perform operations to intake case data via a public access link. The operations include selecting the case dataset including case data from a case repository. The case dataset is associated with a state in a first stage. The operations further include modifying the state associated with the case dataset from the first stage to a second stage. The operations further include selecting, in response to modifying the state of the case data, a ruleset including a first rule and a second rule from a rule repository. The first rule includes a first rule criterion, a first rule outcome action, a first priority, and a first tag. The second rule includes a second rule criterion, a second rule outcome action, a second priority, and a second tag. The operations further include selecting the first rule of the ruleset based on the first priority of the first rule and determining the first criterion of the first rule is not fulfilled. The operations further include selecting, in response to determining the first criterion of the first rule is not fulfilled, the second rule of the ruleset and determining the second criterion of the second rule is fulfilled. The operations further include executing the second rule outcome action of the second rule. The operations further include modifying the case data based on the second tag of the second rule. The operations further include executing a tag action based on the second tag.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
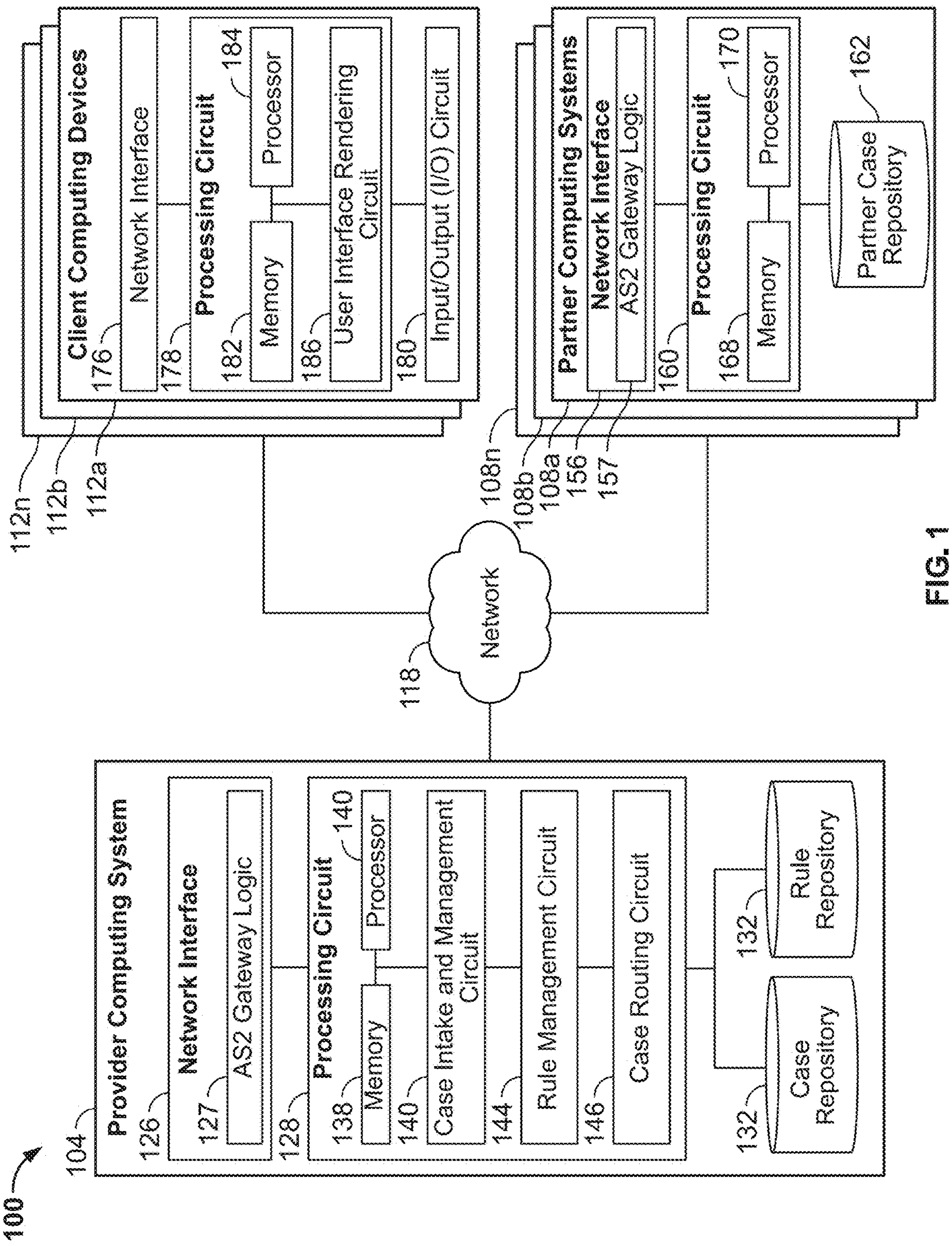
FIG. 1 shows a component diagram of a secure data routing system, according to an example embodiment.

Referring generally to the figures, systems and methods for securely routing data via a cryptographic tag are disclosed. The systems and methods described herein provide for routing of a case dataset using a tag, and thereby help and improve the pharmacovigilance industry by more accurately and securely, routing the case dataset using a simple data tag. For example, by tagging the case dataset with a specific tag based on the rule criterion which was fulfilled, the present systems and methods provide for improved data processing and faster more secure checks at runtime. For instance, the present systems and methods tag each case dataset with a specific tag that is used to route and perform actions on the case dataset. These case dataset are pre-tagged (e.g., tagged before runtime) such that tags do not need to be analyzed and generated at runtime. By doing so, the present systems provide for faster processing at runtime and quicker data querying. For instance, each case dataset can include multiple tags. Accordingly, checking the rules and tagging the case datasets at runtime can result in delays and slow response from the system. Accordingly, the present systems and methods tag the case datasets with the corresponding tags when the rule criterion are evaluated, and before routing the case dataset, thereby providing for a faster and more responsive runtime, while still achieving secure data protection.

Additionally, by determining if the rule criterion is fulfilled and then executing the rule outcome action, in response to the rule criterion being fulfilled, the present systems and methods provide for an improvement to case processing systems by implementing rule outcome actions, in response to specific rule criterion being fulfilled. For instance, in traditional case processing, many actions (e.g., assigning a case, escalating an issue, generating a report) are triggered manually by a user after reviewing case data and applying business logic. This is time-consuming, prone to human error, and creates delays in critical workflows. In comparison, the present systems and methods provide for automated event-driven workflow orchestration. By continuously evaluating incoming or updated case data against predefined rule criteria, and then automatically executing rule outcome actions (e.g., assign to specialist team, send urgent notification, initiate compliance review). By doing so, the present systems and methods provide for faster case processing, thereby eliminating bottlenecks and accelerating processing times, which requires less memory and processing power to communicate back and forth with a user.

Likewise, because the present systems and methods utilize rule criterion specifically defined by rule criterion, the present systems and methods provide for enhanced and more consistent data. For instance, manual application of rules in complex case processing (e.g., adverse event reporting, regulatory compliance) can lead to inconsistencies, missed steps, or non-compliance due to human oversight or varying interpretations, which poses significant regulatory and operational risks. In comparison, the present systems and methods enforces strict and consistent adherence to predefined rules via the rule criterion. Once a rule criterion is met, the corresponding action is executed programmatically, every time. This drastically reduces the risk of non-compliance, ensures that critical steps are never missed, and provides an auditable trail of automated actions, which is vital for regulatory environments.

As used herein, the term "event" or "adverse event" can include any untoward medical occurrence which happens to either a patient or a subject in a clinical investigation or during regular use of a medical product that has been given to that person. For example, the "event" or "adverse event" may encompass any signs which are unfavorable and unexpected for the patient or subject, including any abnormal laboratory findings such as a high blood pressure, a rapid heart rate, etc. The "event" or "adverse event" could be symptoms, or a disease temporally associated with the use of a medical product and does not have to have been previously associated with that product. The term "event" or "adverse event" can further encompass adverse reactions and serious adverse events such as death, life-threatening adverse experiences, inpatient hospitalization, congenital birth defects, disabilities, etc. Further, each "event" or "adverse event" may be defined by the Medical Dictionary for Regulatory Activities (MedDRA) (or other medical code dictionaries) and associated with a specific MedDRA code. Moreover, "event information," "adverse event information," "event data," "medical event data," or "adverse event data" can include information associated with the event such as the date of onset of the event, the date of cessation of the event, the type of event, the dictionary (i.e., digital dictionary, medical dictionary, digital medical dictionary, etc.) or medical term (e.g., MedDRA term), the dictionary or medical code (e.g., MedDRA code), event comments, the outcome of the event, the location of the event (e.g., country where the event occurred), the event duration, patient data for a patient who endured or to which the event occurred, medical products (and associated medical product data) or substances that the patient consumed and/or dosages for the consumed medical products, the event rank, event contacts, the event type, and any associated event documents.

As used herein, the term "case" or "case dataset" can include an Individual Case Safety Report (ICSR) as defined by the standard ISO/HL7 27953 of the International Standards Organization (ISO) as well as any past or future standards governing ICSRs of the ISO, the World Health Organization (WHO), the Food and Drug Administration (FDA), the European Medicines Agency (EMA), or other national health agencies governing ICSRs. Moreover, "case information" "case data" or "case dataset" can include information associated with or included in the case such as adverse event data, case contact or reporter data, a case identifier (e.g., case worldwide ID (WWID), case number, etc.), case priority data, case seriousness data, case documents, medical product data (e.g., substances in the medical product, medical product registrations, medical product dosages, medical product name, etc.) patient data, and other data associated with a case as defined by the standard ISO/HL7 27953 as well as any past or future standards governing ICSRs of the ISO, the WHO, the FDA, the EMA, or other national health agencies governing ICSRs.

As used herein the terms "data" and "information" are interchangeable such that one may be substituted for the other and vice versa.

Referring now to FIG. 1, a system 100 for securely routing data based on a data tag is shown, according to an example embodiment. The system 100 includes a provider computing system 104, one or more partner computing systems 108*a* . . . 108*n*, and one or more client computing devices 112*a* . . . 112*n* connected by a secure network (e.g., a network 118).

The network 118 communicably and operably couples the provider computing system 104, the partner computing systems 108*a* . . . 108*n*, and the client computing devices 112*a* . . . 112*n* such that data communications and computing operations are provided between the provider computing system 104, the partner computing systems 108*a* . . . 108*n*, and the client computing devices 112*a* . . . 112*n* over the network 118. In various embodiments, the network 118 includes any combination of a local area network (LAN), an intranet, the Internet, or any other suitable communications network, directly or through another interface.

The provider computing system 104 is operated and managed by a provider (e.g., a software as a service (SaaS) provider, a cloud services provider, a software provider, a service provider, etc.) and is a computer system. In some embodiments, the provider computing system 104 includes one or more servers (e.g., a cloud computing server) each including one or more processing circuits. In some embodiments, the provider computing system 104 may act as a host and provide an application (e.g., a web-based application, a mobile application, etc.) to the client computing devices 112*a* . . . 112*n* over the network 118 in response to authenticating the respective client computing device 112. For example, the provider computing system 104 may receive authentication data (e.g., a username and corresponding password, a limited-use key, a two-factor authentication code or key, etc.) from one of the client computing devices 112*a* . . . 112*n*. The provider computing system 104 may then authenticate the client computing device (e.g., the client computing device 112*a* . . . 112*na*) based on the authentication data and provide an application to the client computing device 112*a* . . . 112*na* over the network 118. In some embodiments, the provider computing system 104 provides an application to an authenticated client computing device 112*a* without further or continuous authentication.

In some embodiments, the provider computing system 104 may be a multi-tenant system where various elements of hardware and software may be shared by one or more customers. In a multi-tenant system, a user is typically associated with a particular customer. For example, a user of the client computing devices 112*a* . . . 112*n* could be an employee of one of a number of companies which are tenants, or customers, of the provider computing system 104.

In some embodiments, the provider computing system 104 may run on a cloud computing platform. Users can access content on the cloud independently by using a virtual machine image or purchasing access to a service maintained by a cloud repository provider.

In some embodiments, the provider computing system 104 may be provided as Software as a Service ("SaaS") to allow users to access the provider computing system 104 with a thin client.

As shown, the provider computing system 104 includes a network interface 126, a processing circuit 128, a first repository 132 (also referred to as a case repository 132), and a second repository 134 (also referred to as a rule repository 134). In some embodiments, the provider computing system 104 may include an input/output circuit (e.g., similar to an input/output circuit 180 as will described further herein).

The network interface 126 is structured to establish connections with the partner computing systems 108*a* . . . 108*n* and the client computing devices 112*a* . . . 112*n* by way of the network 118. The network interface 126 includes program logic (e.g., AS2 Gateway Logic 127) and/or hardware-based components that connect the provider computing system 104 to the network 118. For example, the network interface 126 may include any combination of a wireless network transceiver (e.g., a cellular modem, a broadband modem, a Bluetooth® transceiver, a Wi-Fi® transceiver, a Li-Fi® transceiver, etc.) and/or a wired network transceiver (e.g., an Ethernet transceiver). In some embodiments, the network interface 126 includes the hardware and machine-readable media structured to support communication over multiple channels of data communication (e.g., wireless, Bluetooth®, near-field communication (NFC). In some embodiments, the network interface 126 includes cryptography logic and capabilities to establish a secure communications session.

The AS2 gateway logic 127 includes programmable instructions that facilitate communication (transmission and receipt) using the Applicability Statement 2 (AS2) communication protocol (as specified in Request for Comment (RFC) 4130) over the network 118 via the network interface circuit 126. For example, using the AS2 gateway logic 127, the network interface 126 may transmit or receive files (e.g., the source file, a case, etc.) or other data to the partner computing systems 108*a* . . . 108*n* or client computing devices 112*a* . . . 112*n* using the AS2 Gateway protocol. In other embodiments, the AS2 gateway logic 127 may transmit or receives files using the most updated Applicability Statement communication protocol (e.g., AS3, etc.).

The processing circuit 128, as shown in FIG. 1, includes a memory 138, a processor 140, a case intake and management circuit 140, a rule management and assessment circuit 144, and a case routing circuit 146. The memory 138 includes one or more memory devices (e.g., RAM, NVRAM, ROM, flash memory, hard disk storage, etc.) that store data and/or computer code for facilitating the various processes described herein. That is, in operation and use, the memory 138 stores at least portions of instructions and data for execution by the processor 140 to control the processing circuit 128. The memory 138 may be or include tangible, non-transient volatile memory and/or non-volatile memory. The processor 140 may be implemented as a general-purpose processor, a central processing unit (CPU), a graphics processing unit (GPU), a quantum processing unit (QPU), an application specific integrated circuit (ASIC), one or more field programmable gate array (FPGAs), a digital signal processor (DSP), a group of processing components or other suitable electronic processing components.

As described herein, the case intake and management circuit 140 is configured to receive, generate, store, and manage case datasets. For instance, the case intake and management circuit 140 may be configured to periodically receive or retrieve a source file including adverse event data associated with an adverse event from a trusted source (e.g., one of the partner case repositories 162). In some embodiments, the case intake and management circuit 140 may then match the adverse event data with medical product data of a medical product repository (not shown), generate a case dataset including case data, and store the case dataset within the case repository 134. In one example, the case intake and management circuit 140 may be an instance of Vault Safety.

In some embodiments, the provider computing system 104 may include multiple case intake and management circuits 140 (e.g., one for each customer, one for each user, etc.). In some embodiments, when generating the case dataset, the case intake and management circuit 140 may further search the case repository 132 for case datasets which may be a duplicate of the newly generated case (e.g., potential duplicate cases). Then, in response to determining that the potential duplicate cases are not a duplicate, the case intake and management circuit 140 may generate the case dataset. In some embodiments, the case intake and management circuit 140 may output (via the network interface circuit 126) one or more of the case datasets as a specific file type (e.g., E2B (R3) XML file, as a Council for International Organizations of Medical Sciences (CIOMS) II PDF file, as a 3500A PDF file, etc.) to one or more of the partner computing systems 108*a* . . . 108*n* or the client computing devices 112*a* . . . 112*n*.

Additionally, the case intake and management circuit 140 may be configured or structured to modify a state of the case dataset, in response to certain criteria being met, from a first stage to a second stage to a third stage, and so on. For instance, the case intake and management circuit 140 may generate a new case and set the state of the case dataset as a beginning stage (e.g., "data entry"). Then, in response to certain criteria being met (e.g., receiving a verification that the case data of the case dataset is correct), the case intake and management circuit 140 may modify the state of the case dataset from the beginning stage to a second stage (e.g., "in-review"). Then, when additional criteria are met (e.g., a quality-control (QC) web form is completed), the case intake and management circuit 140 may modify the state of the case dataset from the second stage to a third stage (e.g., "submission"). This process may be repeated until reaching a final stage (e.g., "Complete"), as will be described further herein.

As described herein, the rule management circuit 144 is configured to receive a specific ruleset including multiple rules from one of the client computing devices 112$a$ . . . 112$n$ and store the ruleset in the rule repository 134. Rules will be described further herein, but may include one or more rule criterion (also referred to as rule criterion expressions), one or more rule outcome actions, a rank or order, a rule trigger, and/or a tag. The rule criterion may include specific data fields that indicate the rule is fulfilled. For instance, the rule criterion may include a specific adverse event of a case dataset (e.g., a specific MedDRA code and term), a specific seriousness of a case dataset (e.g., serious-results in death, serious-hospitalization, non-serious, etc.), a specific medical product (e.g., a specific national drug code (NDC), a specific substance, a specific combination of substances, etc.), a specific reporter language (e.g., Chinese, English, etc.), a specific assessment of the case dataset (e.g., requires manual review, requires additional medical review, requires touchless review, etc.) and the like.

Similarly, the rule trigger may be an event or change in the data that indicates the rule is triggered, and the provider computing system 104 is to determine if the rule criterion is fulfilled. For instance, the rule trigger may include a specific state of a case dataset (e.g., completed, submitted, new, data entry required, a QC stage, etc.), a specific period of time (e.g., every minute, every five minutes, once a year on January 1, etc.)), and/or a specific date/time (e.g., Jan. 1, 2021). In one example, in response to the case dataset entering or reaching a specific state (e.g., the stage or state of the case dataset being modified to the state), the provider computing system 104 may determine the rule trigger is met and determine if the case data fulfills the rule criterion of the rule.

Figure 5:
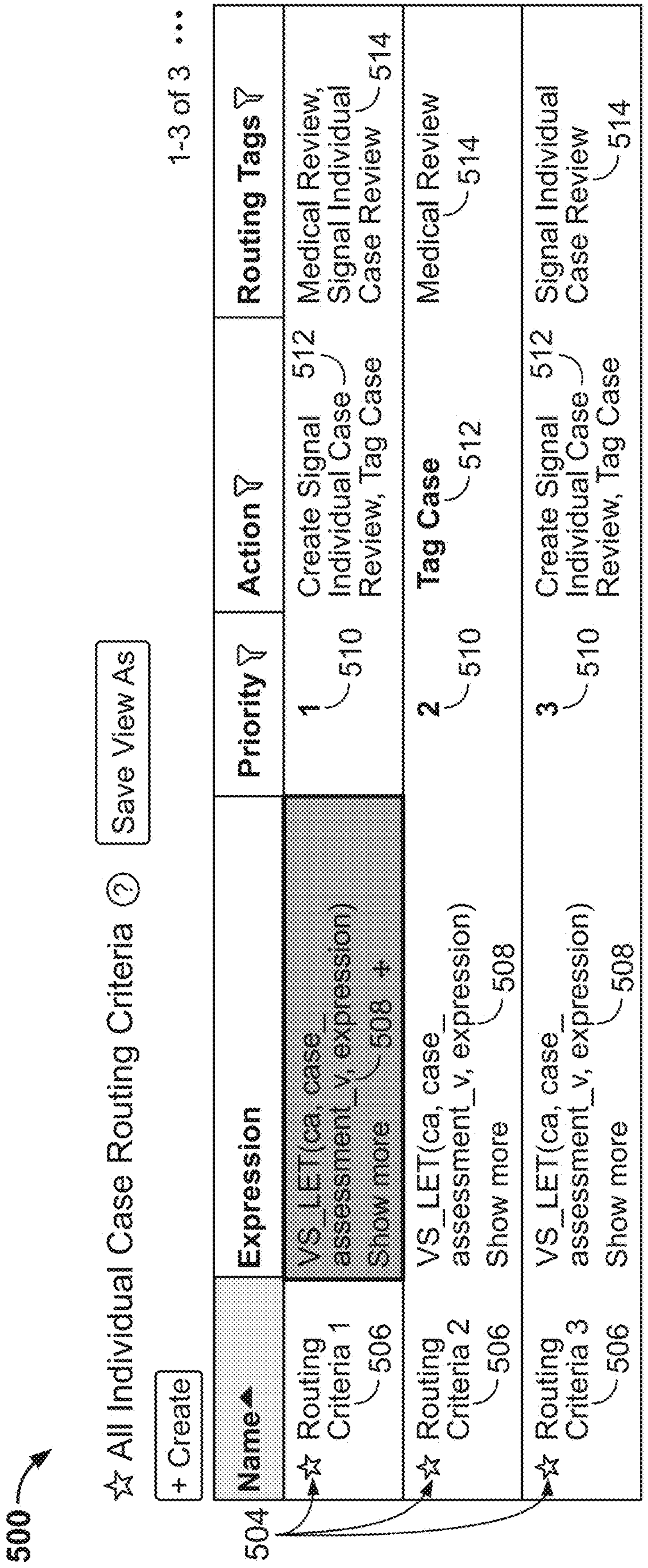
FIG. 5 shows an illustration of some aspects of a user interface generated by the secure data routing system of FIG. 1 to manage a ruleset, according to an example embodiment.

Likewise, the rule outcome action may be a specific function or action the rule management circuit 144 takes in response to the rule criteria being fulfilled. In this regard, the rule outcome action may include a full set of functions and data modification actions such as setting a specific field of case data, adding a specific field to case data, tagging a case dataset with a specific tag, creating a new case dataset, generating and sending a notification to a specific user, changing the state of the case (e.g., from a first stage to a second stage or a third stage, etc.), and the like. FIG. 5 shows some example rule outcome actions in an action field 512.

The tag may be a data tag applied to the case dataset, by the rule management circuit 144, in response to the rule criteria being fulfilled. While the tags will be described further herein, they may be utilized by a case routing circuit 146 to route the case dataset to specific processing circuits and/or computing devices of the system 100 (e.g., one of the partner computing systems 108$a$ . . . 108$n$). In one example, the tags may be cryptographic values or keys generated, by the provider computing system 104, based on the case dataset and/or case data thereof. For instance, the tags may be generated by the provider computing system 104 based on the case data (e.g., a case identifier, a case record number, etc.) to securely encrypt and enclose a key signature therein for routing to another computing device (e.g., one of the client computing devices 112$a$ . . . 112$n$). Then, based on a private key, the client computing device 112$a$ . . . 112$n$ may modify or decrypt the tag to determine the case dataset is authentic.

Additionally, the rule management circuit 144 may be structured or configured to periodically (e.g., every minute, every half-minute, every time a case dataset changes state) determine if any of the rules are fulfilled (e.g., based on the rule trigger). For instance, in response to a case dataset being changed to the completed or "approved" state, the rule management circuit 144 may determine if the case dataset meets or fulfills any of the rules of the rule repository 132. For instance, the rule management circuit 144 may select each rule, in the order they are listed (e.g., rule including the order 1, followed by the rule including the order 2, and so on). Then, in response to determining the rule criterion of the rule matches the case dataset, the rule management circuit 144 may execute the rule outcome action.

The case routing circuit 146 is configured to perform a specific action (e.g., route, delete, modify, duplicate, etc.) on the case dataset, based on a tag applied to the case dataset. For instance, in response to the case dataset including a "create signal case review" tag (see FIG. 5), the case routing circuit 146 may provide the case dataset to a signal analysis circuit (not shown) of the provider computing system 104. In another example, in response to the case dataset including a "medical review" tag, the provider computing system 104 may provide the case dataset to a client computing device 112$a$ . . . 112$n$ associated with a medical reviewer and change the case state to a "medical review" stage.

The case repository 132 is a repository (e.g., a database) that is configured to receive, store, and manage case datasets and their respective data (e.g., case data, adverse event data, etc.). For example, the case repository 132 receives case datasets and related case objects and stores the case datasets therein. Then, in response to receiving a query or a request for one or more case datasets (e.g., a query for all cases that include a specific substance), the case repository 132 provides and/or returns the case datasets stored therein that match the query or request. For example, the case repository 132 may receive a query from the case intake and management circuit 140 for all cases that include a specific criteria (e.g., a specific medical product, a specific country of origin, a specific date range). In response, the case repository 132 may determine each case dataset that includes the specific criteria stored therein and return each case dataset.

Further, the case repository 132 can be structured according to various database types, such as, relational, hierarchical, network, flat, point-in time, and/or object relational. In some embodiments, the case repository 132 includes a plurality of nonvolatile/non-transitory storage media such as solid-state storage media, hard disk storage media, virtual storage media, cloud-based storage drives, storage servers, optical drives, and/or the like.

Still referring to FIG. 1, the rule repository 134 may be repository (e.g., a database) that is configured to receive, store, and manage rulesets of customers. In this regard, the rule repository 134 may receive, store, and manage rulesets including multiple rules. For example, a customer may provide or generate a rule that includes rule criteria of a first medical product and a first adverse event, a specific rule trigger (e.g., a specific case stage), a specific rule outcome action (e.g., submit the case dataset to the FDA), and a specific rule tag. Accordingly, the rule repository 134 may receive the rule from one of the client computing devices 112$a$ . . . 112$n$ and store it therein. Then, in response to a case entering the specific case state, the rule management circuit 144 may select the rule from the rule repository 134 and determine if the rule criteria is met. Accordingly, the rule repository 134 can be structured according to various database types, such as, relational, hierarchical, network, flat, point-in time, and/or object relational. Further, the rule repository 134 may include a plurality of nonvolatile/non-transitory storage media such as solid-state storage media, hard disk storage media, virtual storage media, cloud-based storage drives, storage servers, optical drives, and/or the like.

While not shown, in some embodiments, the provider computing system 104 may include a separate repository for each data type described herein. For instance, the provider computing system 104 may include the case repository 134, the rule repository 132, a medical product repository (not shown), an adverse event repository or dictionary (not shown), a study repository (not shown), and the like.

Still referring to FIG. 1, the partner computing systems 108*a* . . . 108*n* may be managed by third-party partners (e.g., the FDA, the EHA, Health Canada, partner company 1, partner company 2, partner computing system xyz, etc.) and includes a computing system configured to communicate with the provider computing system 104 over the network 118. For instance, the partner computing systems 108*a* . . . 108*n* may be a server computer system, a gateway computing system, a laptop computer, a desktop computer, and any other network-connected device that can communicate over the network 118. For example, one of the partner computing systems 108*a* . . . 108*n* may be the Electronics Submission Gateway (ESG) of the FDA through which one or more E2B XML files may be received from and/or provided to. In another example, one of the partner computing systems 108*a* . . . 108*n* may be a laptop computer operated by an employee of a partner company.

In operation, the partner computing systems 108*a* . . . 108*n* may communicate with the provider computing system 104 to send and/or receive one or more electronic communications (e.g., case datasets, source files, etc.). For instance, a customer (e.g., pharma company 123) may submit case datasets to the FDA over the ESG of the FDA via the provider computing system 104. Accordingly, the provider computing system 104 may receive a request to output a case dataset to the FDA, and then provide the case dataset to a first partner computing system (e.g., the partner computing system 108*a*) associated with the FDA.

As shown, each partner computing system 108*a* . . . 108*n* includes a network interface 156, a processing circuit 160, and a partner case repository 162. In some embodiments, each partner computing system 108*a* . . . 108*n* may include a key repository (not shown) for storing AS2 keys and certificates.

The network interface 156 is structured to establish connections with the provider computing system 104 and/or the client computing device 112*a* . . . 112*n* by way of the network 118. The network interface 156 includes program logic (e.g., AS2 Gateway logic 157) and/or hardware-based components that connect each partner computing system 108*a* . . . 108*n* to the network 118. For example, the network interface 156 may include any combination of a wireless network transceiver (e.g., a cellular modem, a broadband modem, a Bluetooth transceiver, a Wi-Fi® transceiver, a Li-Fi® transceiver, etc.) and/or a wired network transceiver (e.g., an Ethernet transceiver). In some embodiments, the network interface 156 includes the hardware and machine-readable media structured to support communication over multiple channels of data communication (e.g., wireless, Bluetooth®, near-field communication (NFC). In some embodiments, the network interface 156 includes cryptography logic and capabilities to establish a secure communications session.

The AS2 gateway logic 157 includes programmable instructions that facilitate communication (transmission and receipt) using the Applicability Statement 2 (AS2) communication protocol (as specified in Request for Comment (RFC) 4130) over the network 118 via the network interface circuit 156. For example, using the AS2 gateway logic 157, the network interface 156 may transmit or receive files (e.g., the source file, a case, etc.) or other data to the provider computing system 104 or client computing devices 112*a* . . . 112*n* using the AS2 Gateway protocol. In other embodiments, the AS2 gateway logic 157 may transmit or receives files using the most updated Applicability Statement communication protocol (e.g., AS3, etc.).

The processing circuit 160, as shown, includes a memory 168 and processor 170. The memory 168 includes one or more memory devices (e.g., RAM, NVRAM, ROM, flash memory, hard disk storage, etc.) that store data and/or computer code for facilitating the various processes described herein. That is, in operation and use, the memory 168 stores at least portions of instructions and data for execution by the processor 170 to control the processing circuit 160. The memory 168 may be or include tangible, non-transient volatile memory and/or non-volatile memory. The processor 170 may be implemented as a general-purpose processor, an application specific integrated circuit (ASIC), one or more field programmable gate array (FPGAs), a digital signal processor (DSP), a group of processing components or other suitable electronic processing components.

The partner case repository 162 may be similar or the same as the case repository 132 and is a repository (e.g., a database, cloud storage, etc.) that is configured to receive, store, and manage case datasets associated with adverse events. For example, one of the partner computing systems 108*a* . . . 108*n* may receive a case dataset from the provider computing system 104 and store case dataset in the partner case repository 162. Further, the partner case repository 162 can be structured according to various database types, such as relational, hierarchical, network, flat, point-in time, and/or object relational. In some embodiments, the partner case repository 162 includes a plurality of nonvolatile/non-transitory storage media such as solid-state storage media, hard disk storage media, virtual storage media, optical drives, cloud-based storage drives, storage servers, and/or the like.

Still referring to FIG. 1, the client computing devices 112*a* . . . 112*n* are each a computing device. For instance, each client computing device 112*a* . . . 112*n* can be one or more of a mobile phone, a tablet computer, a laptop computer, a smart watch, a wearable device, a medical device, or any other internet-connected device. In operation, the client computing devices 112*a* . . . 112*n* may communicate and interface with the provider computing system 104 via the network 118 to provide a ruleset including one or more rules.

The network interface 176 structured to establish connections with the provider computing system 104 by way of the network 118. The network interface 176 includes program logic and/or hardware-based components that connect the client computing device 112*a* . . . 112*n* to the network 118. For example, the network interface 176 may include any combination of a wireless network transceiver (e.g., a cellular modem, a broadband modem, a Bluetooth® transceiver, a Wi-Fi® transceiver, a Li-Fi® transceiver, etc.) and/or a wired network transceiver (e.g., an Ethernet transceiver). In some embodiments, the network interface 176 includes the hardware and machine-readable media structured to support communication over multiple channels of data communication (e.g., wireless, Bluetooth®, near-field communication (NFC). In some embodiments, the network interface 176 includes cryptography logic and capabilities to establish a secure communications session.

The processing circuit 178, as shown, includes a memory 182, a processor 184, and a user interface generation or rendering circuit 186. The memory 182 includes one or more memory devices (e.g., RAM, NVRAM, ROM, flash memory, hard disk storage, etc.) that store data and/or computer code for facilitating the various processes described herein. That is, in operation and use, the memory 182 stores at least portions of instructions and data for execution by the processor 184 to control the processing circuit 178. The memory 182 may be or include tangible, non-transient volatile memory and/or non-volatile memory. The processor 184 may be implemented as a general-purpose processor, an application specific integrated circuit (ASIC), one or more field programmable gate array (FPGAs), a digital signal processor (DSP), a group of processing components or other suitable electronic processing components.

The user interface rendering circuit 186 may be configured to receive a user interface or webpage (a web interface in an HTML file and related files, a downloaded graphical user interface, etc.) from the provider computing system 104 and render the user interface on the client computing device 112*a* . . . 112*n* via the I/O circuit 180. In this way, the provider computing system 104 may generate one or more user interfaces and provide the one or more user interfaces to the user interface generation circuit 186 to be rendered on the client computing device 112*a* . . . 112*n* (e.g., on a display of the I/O circuit 180 of the client computing device 112*a* . . . 112*n*). For instance, the provider computing system 104 may generate the web form, at step 420. Then, in response to receiving the request to access the web form, the provider computing system 104 may generate the user interface including the web form, and provide the user interface to one of the client computing devices 112*a* . . . 112*n* for rendering and display thereon.

The I/O circuit 180 is structured to receive communications from and provide communications to the user of the client computing device 112*a* . . . 112*n* (e.g., the user). In this regard, the I/O circuit 180 is structured to exchange data with the processing circuit 178 to provide output to the user and to receive input from the user. As a result, the I/O circuit 180 may include a display that may be manipulated by the application. In some embodiments, the I/O circuit 180 may also include a keyboard, a mouse, a joystick, a touch screen, touch areas, soft keys, a microphone, a speaker, a vibration mechanism, a sensor, a radio-frequency identification (RFID) scanner, or other input/output devices described herein.

Figure 2:
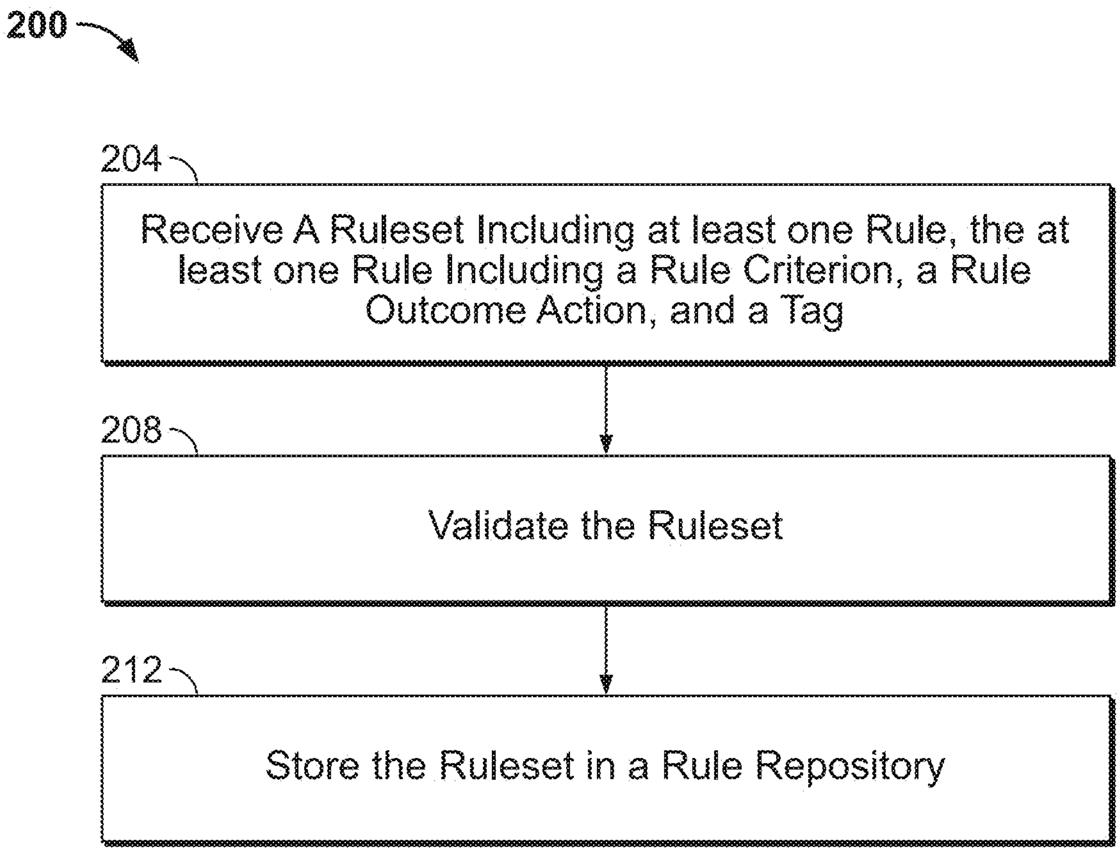
FIG. 2 depicts a flow diagram of a method for receiving and storing a ruleset, according to an example embodiment.

Referring now to FIG. 2, a method 200 receiving and storing a ruleset is shown, according to an example embodiment, according to an example embodiment. Method 200 can be carried out by the system of FIG. 1. More particularly, the method 200 can be carried out by the processing circuit 128 of the provider computing system 104 and through communication with the client computing devices 112*a* . . . 112*n*.

Method 200 commences at step 204 at which the provider computing system 104 receives a ruleset including one or more rules from one of the client computing devices 112*a* . . . 112*n*. In some embodiments, the ruleset may be received from a client computing device 112, in response to the client computing device 112*a* . . . 112*n* providing admin-level credentials (e.g., an admin username and matching password, an admin username and 2-factor authentication, etc.). The rule may include at least one rule criterion. For instance, the rule may include a medical identifier (e.g., an NDC), a case dataset state (e.g., closed, submitted, quality review passed, etc.), an adverse event (e.g., a MedDRA term and code, etc.), a seriousness (e.g., serious-results in death, serious, non-serious, etc.), a report type (e.g., spontaneous, post-marketed, from study, etc.), and other criteria that match case data described herein (e.g., a reporter criteria, a patient criteria (e.g., is pregnant, is Male, etc.).

Moreover, the rule criterion may include an expression including specific data fields that indicate the rule is fulfilled. For instance, the rule criteria may include a specific field of the case data (e.g., medical product identifier, country, etc.) and an expression including the specific field(s) which may be evaluated to true or false. For instance, FIG. 5 shows multiple rule criterion expressions in a rule criterion expression field 508. Accordingly, to determine if the rule criterion is fulfilled, the provider computing system 104 may select the specific fields listed and evaluate them in the expression.

Likewise, the rule may include a rule trigger, which indicates the rule criteria is to be evaluated, as well as a rule outcome action, a tag, and a rank or order value. The rank or order value may define the order in which the rules of the ruleset are to be evaluated. For instance, a rule with an order or rank of "1" may be evaluated first, followed by a rule with order or rank of "2," and so on.

Once the provider computing system 104 has received the ruleset, the method 200 may proceed to step 208 at which the provider computing system 104 the ruleset. To validate the ruleset, the provider computing system 104 may analyze the rule criteria, the tag, and the rule outcome action for errors (e.g., typographical errors, structural errors, syntax errors, etc.). In some embodiments, the provider computing system 104 may execute the expression included in the rule criterion to determine if the expression is valid. For instance, the rule criterion may include the expression "response_date_c>"Aug. 15, 2024"" Accordingly, the provider computing system 104 may determine the rule criteria is not valid due to the typographical error of not including the correct field name "response_date_c". In another example, the rule criterion may include the expression "response_date_c>"Aug. 15, 2024"&&". Accordingly, the provider computing system 104 may determine the rule criteria is not valid due to the syntax error of having no additional statement after "&&". In another example, the provider computing system 104 may not validate the rule in response to determining the rule includes no rule outcome action and/or no tag.

Once the provider computing system 104 has validated the ruleset, the method 200 proceeds to step 212 at which the provider computing system 104 stores the ruleset in the rule repository 134. For instance, the provider computing system 104 may store the ruleset in the rule repository 134 in association with the client or tenant from which the ruleset was received.

Figure 3:
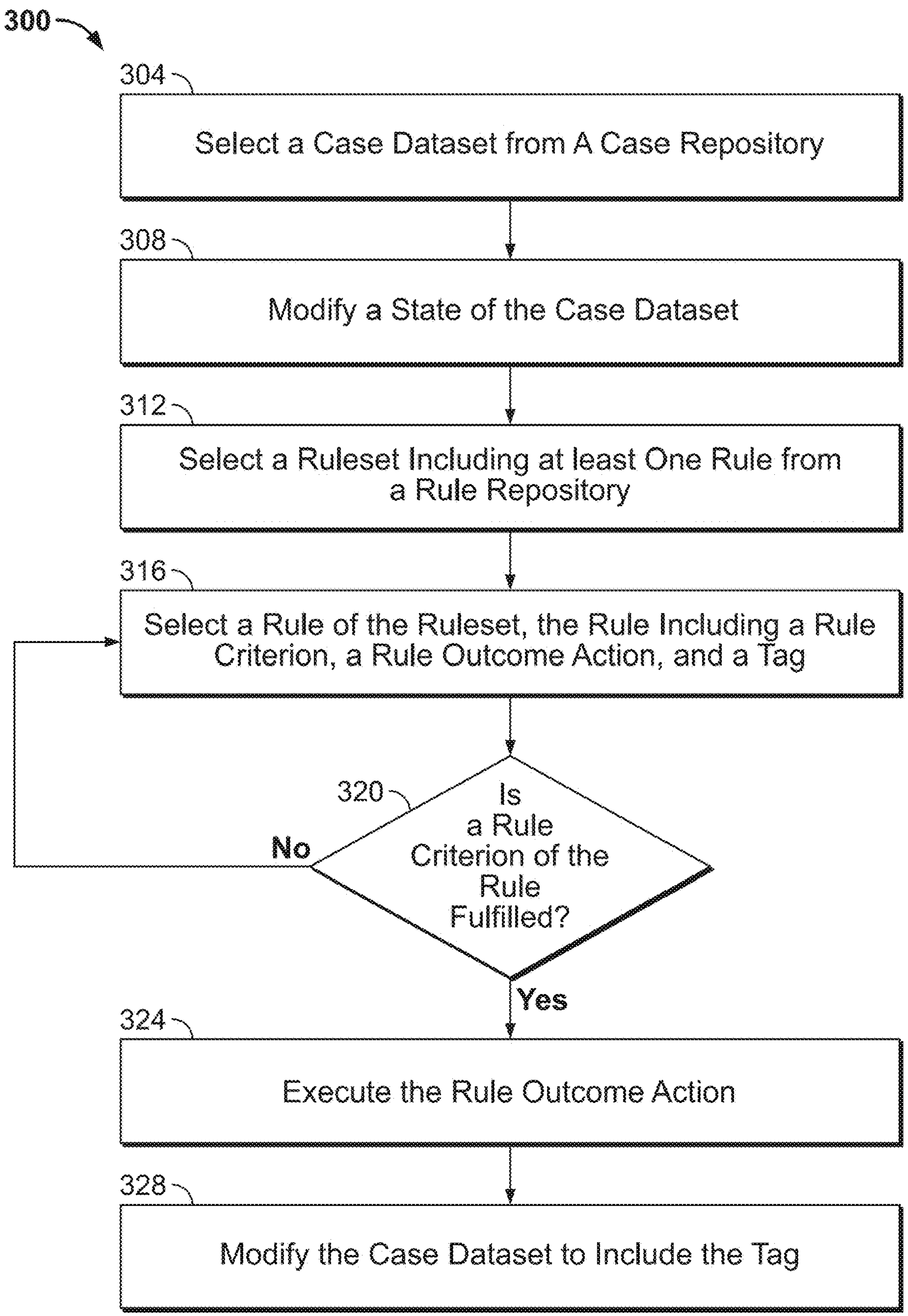
FIG. 3 depicts a flow diagram of a method for executing an action based on a rule of a ruleset, according to an example embodiment.

Referring now to FIG. 3, a method 300 of executing an action based on a rule of a ruleset is shown, according to an example embodiment. While different overall, it should be understood that any steps or discussion of the method 300 or 400 may be applied or included within the method 200, and vice versa, and that such combinations are included within the scope of the present disclosure. For example, the method 200 may include any of the steps 304-328 or 404-412, after or before any steps included in the method 200, and the method 300 may include any of the steps 204-212 or 404-412, after or before any of the steps included in the method 300. Likewise, the method 400 may include any of the steps 204-212 and 304-328 before or after any of the steps included in the method 400. In a specific example, the provider computing system 104 may perform the method 200, then, in response to determining the rule trigger is met, select the ruleset from the rule repository 134 and perform the method 300. Method 300 can be carried out by the system of FIG. 1. More particularly, the method 300 can be carried out by the processing circuit 128 of the provider computing system 104 and through communication with the partner computing systems 108*a* . . . 108*n* and the client computing devices 112*a* . . . 112*n*.

Method 300 commences at step 304 at which the provider computing system 104 selects a case dataset from the case repository 132. In some embodiments, at or before step 304, the provider computing system 104 may receive a request to modify a state of a case dataset. Then, in response to the request, the provider computing system 104 may query the case repository 132 for the case dataset and select the case dataset. In some embodiments, the case dataset may be associated with a specific client or tenant of the provider computing system 104 (e.g., the client or tenant that provided the ruleset in the method 200).

Once the provider computing system 104 has selected the case dataset from the case repository, the method 300 proceeds to step 308 at which the provider computing system 104 modifies a state of the case dataset. As described herein, the state of the case dataset may be a field through which the provider computing system 104 and any user's can define the processes which have occurred, and which still need to occur for the case dataset. For instance, the state may include multiple stages such as a first stage (e.g., "data entry"), a second stage ("quality control" or "quality check"), an optional third stage (e.g., "medical review"), an optional fourth stage (e.g., "submitted"), and the like. Accordingly, at step 308, the provider computing system 104 may modify the state of the case dataset from a first stage (e.g., quality control) to a second stage (e.g., medical review).

Once the provider computing system 104 has modified the state of the case dataset, the method 300 proceeds to step 312 at which the provider computing selects a ruleset including at least one rule from the rule repository 134. The ruleset may be selected in response to the case dataset changing states (e.g., from the first stage to the second stage). In some embodiments, the provider computing system 104 may select the ruleset based on the case dataset and the ruleset being associated with the same customer or tenant.

In some embodiments, the provider computing system 104 may select the ruleset in response to the rule trigger of the ruleset being fulfilled. For instance, the rule trigger identify a state change. Accordingly, prior to step 312, the provider computing system 104 may determine the rule trigger is fulfilled, and then proceed to step 312 in response to the rule trigger being fulfilled. In another example, the rule trigger may be a client computing device 112*a* . . . 112*n* providing a request to evaluate the ruleset. Accordingly, prior to step 312, the provider computing system 104 may receive a request to evaluate the ruleset from one of the client computing devices 112*a* . . . 112*n*. The provider computing system 104 may then determine the rule trigger is fulfilled, and proceed to step 312 in response to the rule trigger being fulfilled.

Once the provider computing system 104 has selected the ruleset from the rule repository 134, the method 300 proceeds to step 316 at which the provider computing system 104 selects a rule of the ruleset. The rule may include a rule criterion, a rule outcome action, and a tag. In some embodiments, the provider computing system 104 may select the rules from the ruleset in the order of the rules. For instance, as described herein, each rule may include an order or rank (e.g., rank or order 1, rank or order 2, rank or order 3, and so on). In this regard, the provider computing system 104 may first select the rule including the rank or order 1, and then proceed through the method 300 to step 320 at which the provider computing system 104 determines if the rule criterion of the rule is fulfilled (as will be described further herein). If the rule criterion of the rule is fulfilled, the method 300 may proceed to step 324 at which the provider computing system 104 executes the rule outcome action of the rule. If the rule criterion is not fulfilled, the method may proceed back to step 316 and select a second rule from the ruleset. The second rule may have a rank or order of 2. This process may be repeated (e.g., the rule with order 3, the rule with order 4, and so on) until a rule criterion of a rule is fulfilled. If no rule criterion is fulfilled, the method 300 may end.

Once the provider computing system 104 has selected the rule of the ruleset, the method 300 proceeds to step 320 at which the provider computing system 104 evaluates the rule criterion of the rule and determines if the rule criterion is fulfilled. For instance, each rule criterion may include an expression including multiple case data fields. Accordingly, the provider computing system 104 may select the fields of the case data and evaluate the expression to true or false. If the expression evaluates to true, the provider computing system 104 may determine the rule criterion is fulfilled, and the method 300 may proceed to step 324 at which the provider computing system 104 executes the rule outcome action. In comparison, if the expression evaluates to false, the provider computing system 104 may determine the rule criterion is not fulfilled, and the method 300 may proceed back to step 316, where a second rule of the ruleset is selected.

In some embodiments, the provider computing system 104 may generate a request including the rule criterion, an application programming interface (API) key, the case data, and/or one or more text queries or prompts. The text query may correspond to the rule criterion. For instance, the request may include the text query "Does the [specific field of the case data] satisfy the [rule criterion expression]?" The provider computing then output the request to a specific partner computing system 108, which may return a file. The file may include text data indicating the rule criterion was or was not fulfilled (e.g., "case dataset 1 passed the rule", etc.).

Once the provider computing system 104 has determined the rule criterion is fulfilled, the method 300 proceeds to step 324 at which the provider computing system 104 executes the rule outcome action. The rule outcome action may be a specific function or action the provider computing system 104 takes in response to the rule criteria being fulfilled. For instance the rule outcome action may include a full set of functions and data modification actions such as setting a specific field of the case data, creating a signal case review data record, adding a specific field to the case data, creating a case dataset, generating a linked or follow-up case dataset, generating and sending a notification to a specific user, changing the state of the case (e.g., from a first stage to a second stage or a third stage, etc.), and the like.

In other embodiments, the rule outcome action may include specific actions to be processed (e.g., via AI-models) and called or requested via a request (e.g., an application programming interface (API) request. For instance, the provider computing system 104 may generate a request including the case dataset, an API key, the case data, and/or one or more text queries or prompts. The text query may correspond to the rule outcome action (e.g., duplicate check, quality assurance check, medical review, medical classification, etc.). For instance, the request may include the text query "Perform a quality assurance check on the case data of the case dataset and report and correct any errors including typographical errors." The provider computing then output the request to a specific partner computing system 108, which may return a file. The file may include query response data identifying a response to the text query.

By determining if the rule criterion is fulfilled and then executing the rule outcome action, in response to the rule criterion being fulfilled, the present systems and methods provide for an improvement to case processing systems by implementing rule outcome actions, in response to specific rule criterion being fulfilled. For instance, in traditional case processing, many actions (e.g., assigning a case, escalating an issue, generating a report) are triggered manually by a user after reviewing case data and applying business logic. This is time-consuming, prone to human error, and creates delays in critical workflows. In comparison, the present systems and methods provide for automated event-driven workflow orchestration. By continuously evaluating incoming or updated case data against predefined rule criteria, and then automatically executing rule outcome actions (e.g., assign to specialist team, send urgent notification, initiate compliance review). By doing so, the present systems and methods provide for faster case processing, thereby eliminating bottlenecks and accelerating processing times, which requires less memory and processing power to communicate back and forth with a user.

Likewise, because the present systems and methods utilize rule criterion specifically defined by rule criterion, the present systems and methods provide for enhanced and more consistent compliance. For instance, manual application of rules in complex case processing (e.g., adverse event reporting, regulatory compliance) can lead to inconsistencies, missed steps, or non-compliance due to human oversight or varying interpretations, which poses significant regulatory and operational risks. In comparison, the present systems and methods enforces strict and consistent adherence to predefined rules via the rule criterion. Once a rule criterion is met, the corresponding action is executed programmatically, every time. This drastically reduces the risk of non-compliance, ensures that critical steps are never missed, and provides an auditable trail of automated actions, which is vital for regulatory environments.

In some embodiments, each rule may include multiple rule outcome actions, and the provider computing system 104 may execute each rule outcome action at step 324. For instance, the rule selected at step 316 may include a first rule outcome action, a second rule outcome action, and a third rule outcome action. Accordingly, at step 324, the provider computing system 104 may execute the first, second, and third rule outcome actions.

Once the provider computing system 104 has executed the rule outcome action(s), the method 300 proceeds to step 328 at which the provider computing system 104 modifies the case dataset to include the tag of the rule. For instance, the case data of the provider computing system 104 may include a tag field, and the provider computing system 104 may modify the tag field to include the tag of the rule. In some embodiments, the rule may include multiple tags (e.g., medical review and signal case review, see FIG. 5). Accordingly, at step 328, the provider computing system 104 may modify the case dataset to include each tag of the rule (e.g., a first tag and a second tag). For instance, the provider computing system 104 may modify the tag field of the case data to include the multiple tags of the rule.

In some embodiments, the tags may be cryptographic values or keys generated, by the provider computing system 104, based on the case dataset and/or case data thereof. For instance, the tags may be generated by the provider computing system 104 based on the case data (e.g., a case identifier, a case record number, etc.) to securely encrypt and enclose a key signature therein for routing to another computing device (e.g., one of the client computing devices 112*a* . . . 112*n*). Then, based on a private key, the client computing device 112*a* . . . 112*n* may modify or decrypt the tag to determine the case dataset is authentic.

For instance, the Then, the provider computing system 104 may generate the key by hashing the case data based on the private key and a specific hashing type. The hashing type can be any hashing type or algorithm including MD5, SHA-1, SHA-2, and the like. Then, the provider computing system 104 may transform the hash by encrypting the hashed value. The encryption type can be any encryption type or algorithm including Triple DES (3DES), AES-256, Blowfish, Twofish, RSA, and the like.

In some embodiments, the tags may be text data that are included in the case dataset (e.g., in the case data) and used to route the case dataset along a specific path or set of lifecycle states. For instance, in response to the case dataset including a specific tag (e.g., medical review), the provider computing 104 may modify the case dataset to set a state of the case dataset to a specific stage (e.g., medical review).

Figure 4:
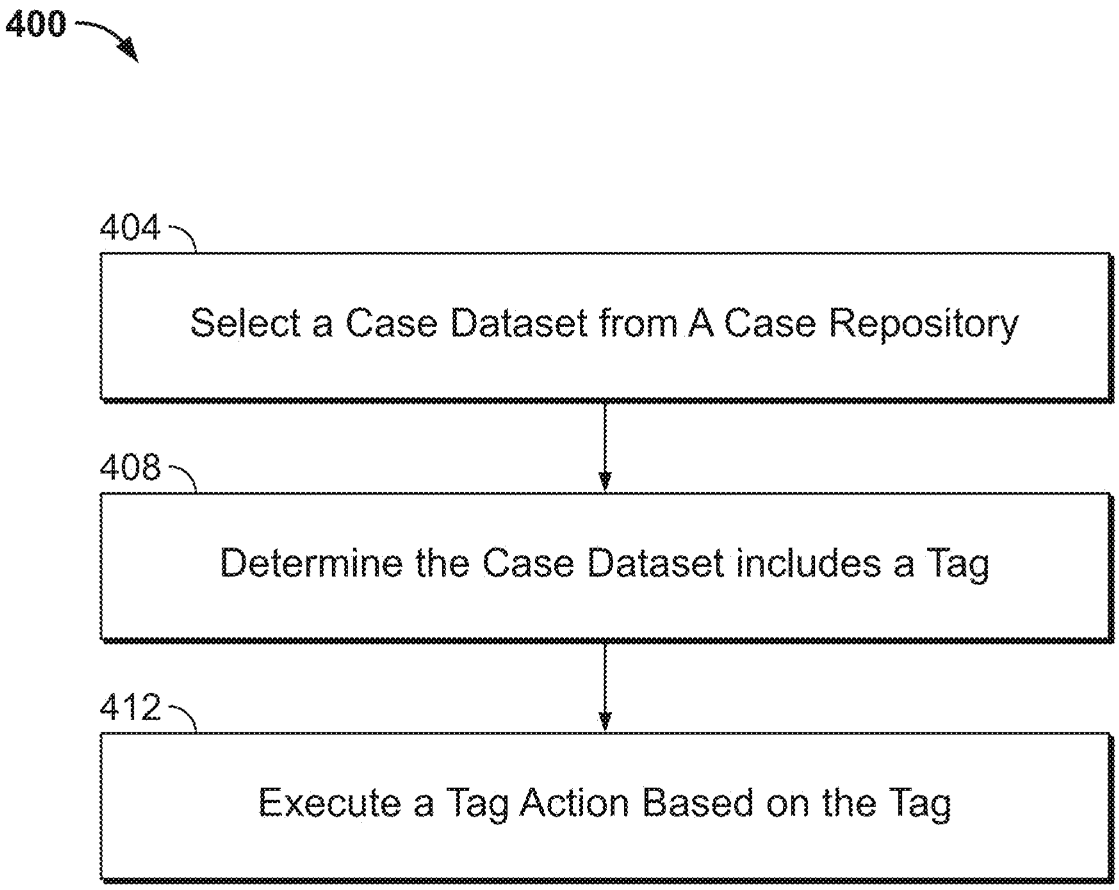
FIG. 4 depicts a flow diagram of a method for routing data based on a tag, according to an example embodiment.

Referring now to FIG. 4, a method 400 of routing data based on a tag is shown, according to an example embodiment. Method 400 can be carried out by the system of FIG. 1. More particularly, the method 400 can be carried out by the processing circuit 128 of the provider computing system 104 and through communication with the client computing devices 112*a* . . . 112*n*.

Method 400 commences at step 404 at which the provider computing system 104 selects a case dataset from the case repository 132. In some embodiments, at or before step 404, the provider computing system 104 may receive a request to determine each case dataset that includes a specific tag (e.g., medical review). Then, in response to the request, the provider computing system 104 may query the case repository 132 for each case dataset that includes the specific tag and select one or more case datasets (e.g., a first case dataset including the tag, a second case dataset including the tag, etc.). In some embodiments, the case dataset may be associated with a specific client or tenant of the provider computing system 104.

Once the provider computing system 104 has selected the case dataset from the case repository, the method 400 proceeds to step 408 at which the provider computing system 104 determines the case dataset includes a specific tag. For instance, the provider computing system 104 may determine the case dataset includes a specific tag by evaluating the tag field of the case data of the case dataset. In some embodiments, at step 408, the provider computing system 104 may determine the case dataset includes multiple tags. In some embodiments, where the provider computing system 104 queries the case repository 132 for case datasets that include the specific tag, the provider computing system 104 and the method 400 may skip step 408 (because it's implied the case dataset(s) include the tag when they are selected from the case repository 134).

Once the provider computing system 104 determines the case dataset includes a specific tag, the method 408 proceeds to step 412 at which the provider computing system 104 executes an action (also referred to as a tag action) based on the tag of the case dataset. The tag action may be specific to the tag and provide for an action (e.g., route, delete, modify, duplicate, etc.) to or based on the case dataset. In one specific example, the tag action may be to route the case dataset to one of the client computing devices 112*a* . . . 112*n* associated with a medical reviewer for medical review. In that regard, the provider computing system 104 may modify the state of the case dataset to a specific stage (e.g., "medical review") and output the case dataset to the one of the client computing devices 112*a* . . . 112*n* associated with the medical reviewer for display thereon. In another example, the tag action may be to generate a specific form or file based on the case dataset (e.g., an E2B (R3) XML file, CIOMS II PDF file, a 3500A PDF file, etc.).

In another example, the tag action may be to modify (e.g., encrypt) at least a portion of the case data based on the tag. For instance, the tag may be generated by the provider computing system 104 based on the case data (e.g., a case identifier, a case record number, etc.) to securely encrypt and enclose a key signature therein for routing to another computing device (e.g., one of the client computing devices 112*a* . . . 112*n*). Accordingly, at step 412, the provider computing system 104 may modify at least a portion of the case data of the case dataset to encrypt the case data based on the tag.

In another example, the tag action may be to generate a request and output the request. For instance, the tags may be used to mark and generate a request including specific text queries associated with or based on the case dataset. In that regard, the provider computing system 104 may generate a request including the case data, an API key, and/or a query. The request may include multiple text queries or prompts that define the specific request and may be selected based on the tag. For instance, in response to the case data including a tag of "signal case review," the provider computing system 104 may generate or select text queries associated with the signal case review (e.g., from a prompt repository (not shown)). Then, once the provider computing system 104 has generated the request, the request may be output to a specific partner computing system 108, which may return a file. The file may include query response data providing a response to the text queries or prompts.

For instance, the provider computing system 104 may have a prompt or text query repository (not shown) including multiple text queries associated with specific tags (e.g., a rank by priority tag). Accordingly, in response to determining the multiple case datasets including the specific tag, the provider computing system 104 may select each text query or prompt associated with the specific tag, such as a first text query (e.g., "Rank each case by priority, where a highest priority case is a case that in unexpected and resulted in a serious outcome (e.g., death)"), a second text query (e.g., "generate a list of all jurisdictions for reporting for each case", a third text query, and so on. The provider computing system 104 may then generate a request including the text queries, an API key, and/or the case data of the selected case dataset. In some embodiments, the request may be generated as a specific file type (e.g., Java Script Object Notation (JSON), XML, CSV, etc.). The provider computing system 104 may then output the request to one of the partner computing systems 108*a* . . . 108*n*. In response, the provider computing system 104 may receive a file from the partner computing system (e.g., 108*n*). The file may include query response data providing a response to the text queries or prompts.

In some embodiments, the provider computing system 104 may modify the case dataset and/or case data thereof based on the query response data. For instance, the provider computing system 104 may modify the case data to include at least a portion of the case data. In other embodiments, the provider computing system 104 may delete, update, or create a new case dataset based on the query response data of the file.

In another example, the case datasets may include the tag "potential duplicates." Accordingly, the provider computing system 104 may select text queries associated with the tag (e.g., "compare the case data of the cases and determine if the cases are duplicates, or if they are simply related cases . . . ". The provider computing system 104 may then generate a request, and receive a file in response including query response data (e.g., "the cases are not duplicates," "the cases are related but not duplicates," etc.). Then, based on the query response data, the provider computing system 104 may modify the case datasets (e.g., to link the related case datasets, delete the duplicate case dataset, etc.).

Referring now to FIG. 5, a user interface shown and displayed to the user of the one or more client computing devices 112*a* . . . 112*n* during the methods 200, 300, and/or 400 are shown, according to an example embodiment. As described herein, the user interface of FIG. 5 may be a webpage generated by the provider computing system 104 and rendered by one or more of the client computing devices 112*a* . . . 112*n* as part of a web application. In other embodiments, the user interfaces of FIG. 5 may be graphical user interfaces downloaded and generated by one or more of the client computing devices 112*a* . . . 112*n* as part of a software application (e.g., a mobile application, etc.). Further, the user interfaces shown on FIG. 5 allows for communication between the user and the provider computing system 104 via the respective client computing device (e.g., 112*a*) (specifically via the I/O circuit 180). Through interaction with the various user interfaces, the user may provide user input, feedback, and other data requested by the provider computing system 104. In this regard, it should be understood that each interaction described herein by the user with the user interface of FIG. 5 may be provided to one or more of the client computing devices 112*a* . . . 112*n* and then transmitted to the provider computing system 104, and that each action described herein as occurring to the respective client computing device 112*a* . . . 112*n* (e.g., navigating to a certain page, generating a popup, etc.) may be performed by the provider computing system 104.

FIG. 5 shows a ruleset page 500, which can be displayed on a display the I/O circuit 180 of one of the client computing devices 112*a* . . . 112*n*. In general, the ruleset page 500 provides the user an interface to initially create and manage a ruleset including multiple rules. As shown, the ruleset page 500 includes multiple rule representations 504. Each rule representation 504 is associated with a specific rule of the ruleset and includes a name field 506, the expression or rule criterion field 508, a priority field 510, the action or rule outcome action field 512, and a tag field 514. To display the ruleset page 500 on one of the client computing devices 112*a* . . . 112*n*, the provider computing system 104 may output the ruleset including each of the rules corresponding to the rule representations 504.

The name field 506 may be a text field that includes the name of the rule associated with the rule representation 504. In some embodiments, the name field 506 may be a selectable button, that when selected, navigates one of the client computing devices 112*a* . . . 112*n* to a rule management page (not shown), where the user can initially create and set the expression associated with the rule criterion of the rule.

The expression or rule criterion field 508 may be a text field that includes the expression which defines the rule criterion of the rule associated with the rule representation 504. As described herein, the expression may include specific case data field names (e.g., "case_assessment_v"), specific functions (e.g., "VS_LET( )"), and specific comparators (e.g., "==," "<=," ">", etc.), which evaluate to true or false when evaluating the rule criterion.

The priority field 510 may be a text or number field that includes the priority or rank of the rule associated with the rule representation 504. As described herein, the priority or rank may define the order in which the rules are selected from the ruleset and evaluated. In this regard, each rule and rule representation 504 may include a different priority or ranking in the priority field 510 (i.e., each rank may not be repeated).

The action or rule outcome action field 512 may be a picklist or option field that includes the rule outcome action(s) of the rule associated with the rule representation 504. For instance, the provider computing system 104 may define specific predefined actions that can be used to populate the action field 512 (e.g., create individual signal case review, tag case, generate case dataset, modify case dataset, delete case dataset, notify user, change the state of the case dataset, etc.).

The tag field 514 may be a text or picklist field that includes the tag(s) of the rule associated with the rule representation 504. For instance, the provider computing system 104 may define specific predefined tags that can be applied to the case dataset.

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FPGAs), digital signal processors (DSPs), or other suitable electronic data processing components structured to execute instructions provided by the memory. The one or more processors may take the form of a single core processor, a multi-core processor (e.g., dual core, quad core, etc.), microprocessor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, a "circuit" as described herein may include components that are distributed across one or more locations. Further, each of the circuits described herein may be distributed across one or more locations (e.g., each as part of one or more remote servers).

An example system for implementing the overall system or portions of the embodiments might include a general-purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks, optical disks, etc. Combinations of the above are also included within the scope of machine-readable media. In this regard, machine-executable instructions comprise, for example, instructions and data which cause a general-purpose computer, special purpose computer, or special purpose processing machine to perform a certain function or group of functions. Each respective memory device may be operable to maintain or otherwise store data relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for securely routing a case dataset based on a tag, the method comprising:

selecting, by a provider computing system, the case dataset including case data from a case repository of the provider computing system, wherein the case dataset is associated with a state in a first stage;

modifying, by the provider computing system, the state associated with the case dataset from the first stage to a second stage;

selecting, by the provider computing system and in response to modifying the state of the case data, a ruleset including a first rule and a second rule from a rule repository of the provider computing system, wherein the first rule includes a first rule criterion, a first rule outcome action, a first priority, and a first tag, wherein the second rule includes a second rule criterion including an expression, a second rule outcome action, a second priority, and a second tag, and wherein the expression is a mathematical expression that evaluates to true or false and includes at least one of: a comparator or a function;

selecting, by the provider computing system, the first rule of the ruleset based on the first priority of the first rule;

determining, by the provider computing system, the first criterion of the first rule is not fulfilled;

selecting, by the provider computing system and in response to determining the first criterion of the first rule is not fulfilled, the second rule of the ruleset;

determining, by the provider computing system, the second rule criterion of the second rule is fulfilled based on the case data and the expression of the second rule criterion;

executing, by the provider computing system, the second rule outcome action of the second rule;

modifying, by the provider computing system, the case data based on the second tag of the second rule; and executing, by the provider computing system, a tag action based on the second tag.

2. The method of claim 1, wherein the second rule outcome action is a modification action, and wherein executing the second rule outcome action comprises:

modifying, by the provider computing system, the state associated with the case dataset from the second stage to a third stage.

3. The method of claim 2, wherein the first stage is an initial stage, and wherein the third stage is a submission stage, and wherein the method further comprises:

outputting, by the provider computing system and in response to the state associated with the case dataset being modified to the third stage, the case dataset including the case data as an E2B XML file.

4. The method of claim 1, determining the second criterion of the second rule is fulfilled comprises:

evaluating, by the provider computing system, the expression of the second rule as true or false based on the case data and the at least one of: the comparator and the function; and determining, by the provider computing system and in response to the expression of the second rule evaluating as true, the second rule criterion is fulfilled.

5. The method of claim 1, and wherein determining the second criterion of the second rule is fulfilled comprises:

generating, by the provider computing system, a request including at least a portion of the case data, the expression, and a text query;

outputting, by the provider computing system, the request to a partner computing system via a secure network;

receiving, by the provider computing system and in response to outputting the request, a file indicating the second rule criterion is fulfilled; and determining, by the provider computing system, the second rule criterion is fulfilled based on the received file.

6. The method of claim 1, wherein the second tag is a cryptographic tag, and wherein modifying the case data based on the second tag comprises:

generating, by the provider computing system, the cryptographic tag, and encrypting, by the provider computing system, at least a portion of the case data based on the cryptographic tag.

7. The method of claim 1, wherein executing the tag action comprises:

determining, by the provider computing system, a text query based on the second tag;

generating, by the provider computing system, a request including at least a portion of the case data and the text query;

outputting, by the provider computing system, the request to a partner computing system via a secure network; and receiving, by the provider computing system and in response to outputting the request, a file.

8. The method of claim 7, further comprising:

selecting, by the provider computing system, a second case dataset including second case data from the case repository, wherein the request further includes at least a portion of the second case data; and determining, by the provider computing system, the first case dataset is associated with the second case dataset based on the received file; and modifying, by the provider computing system, the first case dataset to include a link to the second case dataset.

9. The method of claim 7, further comprising:

selecting, by the provider computing system, a plurality of second case datasets from the case repository, wherein each second case dataset includes second case data;

wherein the request further includes at least a portion of the second case data from each second case dataset of the plurality of second case datasets; and determining, by the provider computing system, a priority associated with the first case dataset and each second case dataset of the plurality of second case datasets based on the received file; and modifying, by the provider computing system, the first case dataset to include the priority associated with the first case dataset.

10. A method for securely routing a case dataset based on a tag, the method comprising:

selecting, by a provider computing system, the case dataset including case data from a case repository of the provider computing system;

receiving, by the provider computing system, a request to evaluate a ruleset;

selecting, by the provider computing system and in response the request, the ruleset including a first rule and a second rule from a rule repository of the provider computing system, wherein the first rule includes a first rule criterion, a first rule outcome action, a first priority, and a first tag, wherein the second rule includes a second rule criterion including an expression, a second rule outcome action, a second priority, and a second tag, and wherein the expression is a mathematical expression that evaluates to true or false and includes at least one of: a comparator or a function;

selecting, by the provider computing system, the first rule of the ruleset based on the first priority of the first rule;

determining, by the provider computing system, the first criterion of the first rule is not fulfilled;

selecting, by the provider computing system and in response to determining the first criterion of the first rule is not fulfilled, the second rule of the ruleset;

determining, by the provider computing system, the second rule criterion of the second rule is fulfilled based on the case data and the expression of the second rule criterion;

executing, by the provider computing system, the second rule outcome action of the second rule;

modifying, by the provider computing system, the case data based on the second tag the second rule; and executing, by the provider computing system, a tag action based on the second tag.

11. The method of claim 10, wherein the second rule outcome action is a modification action, and wherein executing the second rule outcome action comprises:

modifying, by the provider computing system, at least a portion of the case data based on the second rule outcome action.

12. The method of claim 10, wherein determining the second criterion of the second rule is fulfilled comprises:

evaluating, by the provider computing system, the expression of the second rule as true or false based on the case data and the at least one of: the comparator and the function; and determining, by the provider computing system and in response to the expression of the second rule evaluating as true, the second rule criterion is fulfilled.

13. The method of claim 10, wherein determining the second criterion of the second rule is fulfilled comprises:

generating, by the provider computing system, a request including at least a portion of the case data, the expression, and a text query;

outputting, by the provider computing system, the request to a partner computing system via a secure network;

receiving, by the provider computing system and in response to outputting the request, a file indicating the second rule criterion is fulfilled; and determining, by the provider computing system, the second rule criterion is fulfilled based on the received file.

14. The method of claim 10, wherein the second tag is a cryptographic tag, and wherein modifying the case data based on the second tag comprises:

generating, by the provider computing system, the cryptographic tag, and encrypting, by the provider computing system, at least a portion of the case data based on the cryptographic tag.

15. The method of claim 10, wherein executing the tag action comprises:

determining, by the provider computing system, a text query based on the second tag;

generating, by the provider computing system, a request including at least a portion of the case data and the text query;

outputting, by the provider computing system, the request to a partner computing system via a secure network; and receiving, by the provider computing system and in response to outputting the request, a file.

16. The method of claim 15, further comprising:

selecting, by the provider computing system, a second case dataset including second case data from the case repository, wherein the request further includes at least a portion of the second case data; and determining, by the provider computing system, the first case dataset is associated with the second case dataset based on the received file; and modifying, by the provider computing system, the first case dataset to include a link to the second case dataset.

17. The method of claim 15, further comprising:

selecting, by the provider computing system, a plurality of second case datasets from the case repository, wherein each second case dataset includes second case data;

wherein the request further includes at least a portion of the second case data from each second case dataset of the plurality of second case datasets; and determining, by the provider computing system, a priority associated with the first case dataset and each second case dataset of the plurality of second case datasets based on the received file; and modifying, by the provider computing system, the first case dataset to include the priority associated with the first case dataset.

18. A non-transitory computer readable medium having computer executable instructions embodied therein that, when executed by at least one processor of a computing system, cause the computing system to perform operations to securely route a case dataset based on a tag, the operations comprising:

selecting the case dataset including case data from a case repository of the computing system, wherein the case dataset is associated with a state in a first stage;

modifying the state associated with the case dataset from the first stage to a second stage;

selecting, in response to modifying the state of the case data, a ruleset including a first rule and a second rule from a rule repository of the computing system, wherein the first rule includes a first rule criterion, a first rule outcome action, a first priority, and a first tag, wherein the second rule includes a second rule criterion including an expression, a second rule outcome action, a second priority, and a second tag, and wherein the expression is a mathematical expression that evaluates to true or false and includes at least one of: a comparator or a function;

selecting the first rule of the ruleset based on the first priority of the first rule;

determining the first criterion of the first rule is not fulfilled;

selecting, in response to determining the first criterion of the first rule is not fulfilled, the second rule of the ruleset;

determining the second rule criterion of the second rule is fulfilled based on the case data and the expression of the second rule criterion;

executing the second rule outcome action of the second rule;

modifying the case data based on the second tag of the second rule; and executing a tag action based on the second tag.

19. The non-transitory computer readable medium of claim 18, wherein executing the tag action comprises:

determining a text query based on the second tag;

generating a request including at least a portion of the case data and the text query;

outputting, by the provider computing system, the request to a partner computing system via a secure network; and receiving, in response to outputting the request, a file.

20. The non-transitory computer readable medium of claim 19, wherein the operations further include:

selecting a second case dataset including second case data from the case repository, wherein the request further includes at least a portion of the second case data; and determining the first case dataset is associated with the second case dataset based on the received file; and modifying the first case dataset to include a link to the second case dataset.

* * * * *